Oct. 11, 1932.  S. F. CRUMBACK  1,882,410
CUSHIONED AIRPLANE PROPELLER
Filed Sept. 3, 1930
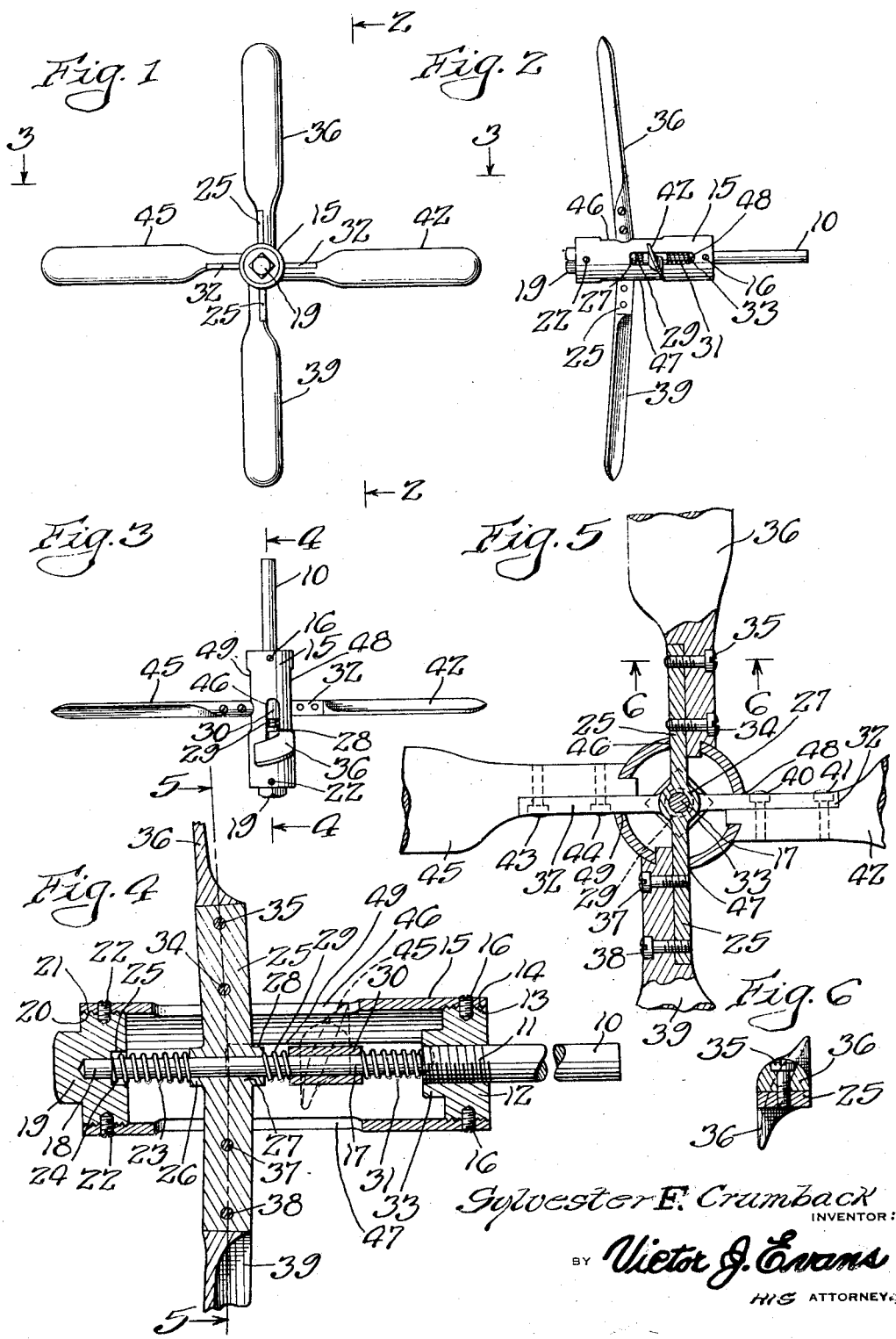
Sylvester F. Crumback
INVENTOR
BY Victor J. Evans
HIS ATTORNEY Patented Oct. 11, 1932

1,882,410

UNITED STATES PATENT OFFICE

SYLVESTER F. CRUMBACK, OF AURORA, ILLINOIS

CUSHIONED AIRPLANE PROPELLER

Application filed September 3, 1930. Serial No. 479,566.

This invention relates to certain novel improvements in cushioned airplane propellers, and has for its principal object the provision of an improved construction of this character which will be highly efficient in use and economical in manufacture.

Among the several objects of this invention is the provision of a novel and improved construction of the character described herein comprising a plurality of airplane propeller blades slidably mounted for longitudinal movement in a housing which is adapted to be mounted on and rotatable with the power driven shaft of an airplane in a manner such that undue strain on the motor and power driven shaft are eliminated when the plane takes off from the ground.

Another object of the invention is the provision of a novel arrangement of airplane propellers which advance forwardly longitudinally of the power driven shaft as the speed of revolution of the propellers increases and which move rearwardly as the speed of the propellers decreases thereby providing a propeller construction which is adapted to "bite" into the load as the airplane moves from the ground to flying position in the air while when the speed of the propellers is decreased for landing purposes my improved propellers move rearwardly into idling position thereby facilitating landing of the plane.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is an end elevational view depicting a preferred form of construction of the invention;

Fig. 2 is a side elevational view partly in section taken substantially on line 2—2 in Fig. 1;

Fig. 3 is a plan view partly in section taken substantially on the line 3—3 in Fig. 1;

Fig. 4 is a sectional view taken substantially on the line 4—4 in Fig. 3;

Fig. 5 is a sectional view taken substantially on the line 5—5 in Fig. 4; and

Fig. 6 is a sectional view taken substantially on the line 6—6 in Fig. 5.

Referring to the drawing wherein a preferred form of construction of my invention is depicted, 10 indicates a shaft portion, the inner end portion of which is threaded as indicated at 11 to receive a plug 12. The plug 12 is threaded exteriorly as indicated at 13 to receive the threaded portion 14 of a housing 15, the housing 15 being secured to the plug 12 by means of screws 16 or the like. Integral with the shaft portion 10 is a reduced portion 17 which extends longitudinally through the housing 15 and this portion 17 has a portion 18 which is seated in a recess provided in a plug 19. The plug 19 includes a threaded portion 20 which is mounted in a threaded portion 21 of the housing 15. The plug 19 is secured to the housing 15 by means of screws or the like 22.

A coil spring 23 is mounted on the shaft portion 17 and this spring includes an end portion 24 which is disposed in a recess 25 in the plug 19. Mounted on the shaft 17 inwardly of the spring 24 is the hub portion 27 of an arm 25 on which is provided a boss 26 that abuts the spring 24. A boss 28 is provided on the hub portion 27 of arm 25 and abutting this boss 28 is one end of a coil spring 29 carried by the shaft 17.

Mounted on the shaft 17 between the spring 29 and a spring 31 is the hub portion 30 of an arm 32 and it may be seen by referring to Fig. 4, that one end portion of the spring 31 abuts the hub 30 while the other end abuts a boss 33 provided in the plug 12.

Attached to the arm 25 by means of screws 34 and 35 is a propeller blade 36 and likewise attached to the arm 25 by means of screws 37 and 38 is a propeller blade 39 which is similar to the blade 36. As best shown in Fig. 2, the blades 36 and 39 have a forwardly extending contour so that they are disposed toward each other at an angle of less than 180°. Attached to the arm 32 by means of screws 40 and 41 is a propeller blade 42 and likewise attached to the arm 32 by means of screws 43 and 44 is a propeller blade 45. As shown in Fig. 3, the blades 42 and 45 extend at an angle of 180° from each other and I have found that this arrangement of the blades 42 and 45 together with the arrangement of the blades 36 and 39, the latter being disposed less than 180° from each other, is particularly advantageous in preventing what is known as "cramming" of air between the two sets of blades.

Provided in the housing 15 are oppositely disposed longitudinally extending slots 46 and 47 in which the arm 25 is adapted to travel, in a manner to be described presently, and similar slots 48 and 49 are provided in the housing 15 and the arm 32 is adapted to travel in these slots 48 and 49 in a manner to be described presently.

The shaft 10 may be attached to the power driven shaft of an airplane motor in any approved manner so as to rotate the shaft 10 and housing 15 therewith. When housing 15 is rotated slowly at idling or low speeds of the motor to which the shaft 10 is attached, the arms 25 and attached blades 36 and 39 will be disposed in the slots 46 and 47 substantially in the position shown in Fig. 4, while the arm 32 and attached blades 42 and 45 will be disposed in the position of the hub portion 30 of arm 32 in Fig. 4. As the speed of revolution of the motor, attached shaft 10, and housing 15 is increased the arm 25 and attached blades 36 and 39 move forwardly toward the outer end of the housing 15 against the action of the spring 24 while at the same time the arm 32 and attached blades 42 and 45 move forwardly, the arm 32 moving in the slots 48 and 49, against the action of the spring 29. I have found this longitudinal movement of the two sets of propeller blades is particularly advantageous in permitting the motor to take up the load of the plane in starting while materially increasing the efficiency of the propellers. I have found, also, that this construction while materially eliminating strain on the motor when the plane takes off the ground likewise enables the plane to be landed readily since when the speed of the motor is reduced the two sets of propellers move rearwardly in the housing 15 due to the action of the springs 24 and 29 against the arms 25 and 32, and thus take an idling position. The above mentioned advantages are not to be considered a limitation of my improved propeller construction but are enumerated only for purposes of illustration.

From the foregoing description of my invention it will be apparent to persons skilled in the art that I have provided a novel and improved propeller construction for aircraft which, while being simple in construction and highly efficient in use is economical in manufacture.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

An aircraft propeller structure comprising a power driven shaft, propellers mounted on said shaft for axial movement therealong and away from the fuselage as the speed of rotation of said shaft and propellers increase, said propellers being arranged at substantially a right angle to each other, and springs on said shaft including a spring between said propellers, compressed as the propellers move forwardly, and urging the propellers rearwardly, with respect to the fuselage, as the speed of rotation of the shafts and propellers decrease.

In testimony whereof I affix my signature.

SYLVESTER F. CRUMBACK.